US006671591B2

(12) United States Patent
Wolf et al.

(10) Patent No.: US 6,671,591 B2
(45) Date of Patent: Dec. 30, 2003

(54) SYSTEM AND METHOD FOR MONITORING LOCOMOTIVE OPERATION (75) Inventors: Daniel F. Wolf, Erie, PA (US); Gerald James Hess, Jr., Erie, PA (US); John Louis Caporale, Jr., Erie, PA (US)

(73) Assignee: General Electric Company, Schenectady, NY (US)

( * ) Notice: Subject to any disclaimer, the term of this patent is extended or adjusted under 35 U.S.C. 154(b) by 37 days.

(21) Appl. No.: 09/873,587

(22) Filed: Jun. 4, 2001

(65) Prior Publication Data
US 2002/0183901 A1 Dec. 5, 2002

(51) Int. Cl.[7] ............................................. F02N 17/02
(52) U.S. Cl. ..................... 701/19; 477/79; 477/114; 477/166; 477/906; 74/865; 74/336 R; 123/179.19; 123/424
(58) Field of Search ..................... 701/19, 20; 477/166, 477/79, 114, 906, 74; 74/865, 336 R; 123/328, 339.1, 680, 491, 179.19, 424

(56) References Cited

U.S. PATENT DOCUMENTS

| 4,042,810 A | | 8/1977 | Mosher | |
|---|---|---|---|---|
| 4,046,032 A | * | 9/1977 | Braun et al. | 74/865 |
| 5,528,901 A | * | 6/1996 | Willis | 60/626 |
| 5,828,979 A | * | 10/1998 | Polivka et al. | 701/117 |
| 5,878,711 A | * | 3/1999 | Kamura et al. | 123/295 |
| 5,928,110 A | * | 7/1999 | Vornehm et al. | 477/166 |
| 5,941,792 A | * | 8/1999 | Amendt et al. | 477/74 |
| 6,126,247 A | | 10/2000 | Paul et al. | |
| 6,170,452 B1 | * | 1/2001 | Wisinski | 123/179.4 |
| 6,322,025 B1 | | 11/2001 | Colbert et al. | |
| 6,470,844 B2 | * | 10/2002 | Biess | 123/142.5 R |

FOREIGN PATENT DOCUMENTS

| JP | 2002-330503 | 11/2002 |
|---|---|---|
| JP | 2002-330504 | 11/2002 |

* cited by examiner

Primary Examiner—Thomas G. Black
Assistant Examiner—Tuan L To
(74) Attorney, Agent, or Firm—Senniger, Powers, Leavitt & Roedel; Carl Rowold (57) ABSTRACT A locomotive monitoring system defines several mutually exclusive operating states for a locomotive. The amount of time the locomotive operates in each state is preferably determined and recorded. This recorded information can then be evaluated with a view towards improving locomotive operations. For example, a plurality of mutually exclusive idle states can be defined and monitored to determine how long a locomotive idles under certain conditions instead of automatically shutting down for the purpose of conserving fuel. In this manner, the sources of lost fuel savings can be readily identified, quantified and addressed. An event log is also provided for chronicling certain operating events of interest over time, such as those relating to the starting, stopping and/or idling of the locomotive's engine.

32 Claims, 4 Drawing Sheets

AESS Summary Report — 300

R.R._Date Summary — 302 [Help]

| | | |
|---|---|---|
| Railroad | BNSF | |
| Road Number | 4570 | |
| Installation Date | 1/1/1987 | |
| Last Report Date | 1/1/1987 | |
| Current Report Date | 04/16/2001 | |

Savings Summary — 304 [Help]

| | Currency | Gallons/Liters |
|---|---|---|
| ACTUAL AESS SAVINGS | 752.15 | 601.72 |
| TOTAL LOST SAVINGS | 4928.26 | 3942.61 |

Idle Summary — 306 [Help]

| | Hours | Percent |
|---|---|---|
| Automatic Stop | 171.92 | 13.24 |
| Disabled | 15.11 | 1.16 |
| Forced Idle | 352.53 | 27.15 |
| Restricted Idle | 45.50 | 3.50 |
| Operator Induced Idle | 643.34 | 49.55 |
| AESS Fault Inactive Idle | 34.45 | 2.65 |
| Suspend Idle | 35.53 | 2.74 |
| Total Idle Opportunity | 1298.38 | 100.00 |
| Required Idle | 325.67 | |
| External Disable Idle | 0.00 | |
| Non AESS Fault Inactive Idle | 63.63 | |
| Total Idle | 1687.68 | |

Parameter Restricting Automatic Stop Summary — 308 [Help]

| | Hours |
|---|---|
| Air Call | 76.42 |
| Ambient Temperature | 71.54 |
| Battery Charging Current | 14.37 |
| Cranking Restriction Exclusion | 0.00 |
| Oil Temperature | 42.25 |

Parameters Initiating Automatic Start Summary — 310 [Help]

| | Counts |
|---|---|
| Air Call | 15 |
| Ambient Temperature | 23 |
| Battery Voltage | 3 |
| Warm-up Strategy after Start | 7 |
| Max Shutdown Time(2hour) | 363672 |

Stop/Start Summary — 312 [Help]

| | Counts |
|---|---|
| Successful Automatic Stops | 35 |
| Successful Automatic Starts | 35 |
| Total Successful Starts (any Start) | 255 |

Control Panel — 314

[Print] [Browse] [Close] [Help] [Event Log] [Refresh]

● Current Statistics
○ Cumulative Statistics

Fuel Consumption Per Hour: 3.5
Fuel Cost Gallons/Liters: 1.25

GE7FDL Engine = 3.5US Gallons (13.25L) per hour in idle

FIG. 4

| No. | Time | Event | Description |
|---|---|---|---|
| 1 | Thu May 10 12:26:00 2001 | MODE CHANGE | AESS MODE change from OFF to ACTIVE |
| 2 | Thu May 10 12:26:01 2001 | ENGINE START | Manual crank |
| 3 | Thu May 10 12:27:01 2001 | MODE CHANGE | AESS MODE change from ACTIVE to SUSPENDED |
| 4 | Thu May 10 12:28:09 2001 | MODE CHANGE | AESS MODE change from SUSPENDED to ACTIVE |
| 5 | Thu May 10 12:28:09 2001 | MODE CHANGE | AESS MODE change from ACTIVE to OFF |
| 6 | Thu May 10 12:28:30 2001 | MODE CHANGE | AESS MODE change from OFF to ACTIVE |
| 7 | Thu May 10 12:31:30 2001 | MODE CHANGE | AESS MODE change from OFF to ACTIVE |
| 8 | Thu May 10 12:31:00 2001 | ENGINE START | Manual crank |
| 9 | Thu May 10 12:42:00 2001 | MODE CHANGE | AESS MODE change from ACTIVE to SUSPENDED |
| 10 | Thu May 10 12:43:00 2001 | MODE CHANGE | AESS MODE change from OFF to ACTIVE |
| 11 | Thu May 10 12:43:00 2001 | ENGINE START | Manual crank |
| 12 | Thu May 10 12:43:47 2001 | MODE CHANGE | AESS MODE change from ACTIVE to OFF |
| 13 | Thu May 10 13:24:47 2001 | MODE CHANGE | AESS MODE change from OFF to ACTIVE |
| 14 | Thu May 10 13:32:32 2001 | MODE CHANGE | AESS MODE change from ACTIVE to INACTIVE |
| 15 | Thu May 10 13:32:32 2001 | MODE CHANGE | AESS MODE change from INACTIVE to ACTIVE |
| 16 | Thu May 10 13:33:41 2001 | MODE CHANGE | AESS MODE change from ACTIVE to INACTIVE |
| 17 | Thu May 10 13:33:41 2001 | MODE CHANGE | AESS MODE change from INACTIVE to ACTIVE |
| 18 | Thu May 10 13:36:08 2001 | MODE CHANGE | AESS MODE change from ACTIVE to OFF |
| 19 | Thu May 10 13:37:08 2001 | MODE CHANGE | AESS MODE change from OFF to ACTIVE |
| 20 | Thu May 10 13:42:50 2001 | STOP | Auto stop |
| 21 | Thu May 10 13:43:50 2001 | ENGINE START | Manual crank |
| 22 | Thu May 10 13:51:37 2001 | MODE CHANGE | AESS MODE change from ACTIVE to OFF |
| 23 | Thu May 10 13:51:37 2001 | MODE CHANGE | AESS MODE change from OFF to ACTIVE |
| 24 | Thu May 10 13:54:03 2001 | MODE CHANGE | AESS MODE change from ACTIVE to SUSPENDED |
| 25 | Thu May 10 13:54:03 2001 | MODE CHANGE | AESS MODE change from SUSPENDED to OFF |
| 26 | Thu May 10 13:54:29 2001 | MODE CHANGE | AESS MODE change from OFF to ACTIVE |
| 27 | Thu May 10 13:56:29 2001 | MODE CHANGE | AESS MODE change from OFF to ACTIVE |
| 28 | Thu May 10 13:56:00 2001 | ENGINE START | Manual crank |
| 29 | Thu May 10 14:02:00 2001 | ENGINE STOP | Auto |
| 30 | Thu May 10 14:03:44 2001 | ENGINE START | Manual crank |
| 31 | Thu May 10 14:05:44 2001 | MODE CHANGE | AESS MODE change from OFF to ACTIVE |
| 32 | Thu May 10 14:05:00 2001 | ENGINE START | Manual crank |
| 33 | Thu May 10 14:12:00 2001 | MODE CHANGE | AESS MODE change from ACTIVE to INACTIVE |
| 34 | Thu May 10 14:12:51 2001 | MODE CHANGE | AESS MODE change from INACTIVE to ACTIVE |
| 35 | Thu May 10 14:16:51 2001 | ENGINE STOP | Auto |
| 36 | Thu May 10 14:16:20 2001 | MODE CHANGE | AESS MODE change from ACTIVE to INACTIVE |
| 37 | Thu May 10 14:19:20 2001 | ENGINE START | Operator forced the engine to start |
| 38 | Thu May 10 14:19:15 2001 | MODE CHANGE | AESS MODE change from INACTIVE to ACTIVE |
| 39 | Thu May 10 14:19:15 2001 | RESTRICTED EVENT | Ambient temperature is outside the n/max limits |
| 40 | Thu May 10 14:19:50 2001 | MODE CHANGE | AESS MODE change from ACTIVE to INACTIVE |
| 41 | Thu May 10 14:19:50 2001 | MODE CHANGE | AESS MODE change from INACTIVE to ACTIVE |
| 42 | Thu May 10 14:23:00 2001 | MODE CHANGE | AESS MODE change from OFF to ACTIVE |
| 43 | Thu May 10 14:23:00 2001 | ENGINE START | Manual crank |
| 44 | Thu May 10 14:26:29 2001 | ENGINE STOP | Auto |
| 45 | Thu May 10 14:27:29 2001 | ENGINE START | Manual crank |
| 46 | Thu May 10 14:30:00 2001 | MODE CHANGE | AESS MODE change from OFF to ACTIVE |
| 47 | Thu May 10 14:30:00 2001 | ENGINE START | Manual crank |
| 48 | Thu May 10 14:33:29 2001 | ENGINE STOP | Auto |
| 49 | Thu May 10 14:34:29 2001 | ENGINE START | Manual crank |

SYSTEM AND METHOD FOR MONITORING LOCOMOTIVE OPERATION

FIELD OF THE INVENTION

The present invention relates to monitoring operation of a locomotive, and more particularly to monitoring the starting, stopping and/or idling of a locomotive with a view towards conserving fuel.

BACKGROUND OF THE INVENTION

In recent years, locomotives have been equipped with systems for automatically starting and stopping their engines when predefined conditions exist. The primary purpose of such systems is to conserve fuel, thereby lowering fuel costs while also preserving precious energy resources. For instance, a locomotive may be configured to automatically shutdown after operating a certain amount of time in parked idle so as to prevent the locomotive from needlessly wasting fuel. The locomotive may then automatically restart when, for example, an operator signals an intention to motor the locomotive, such as by moving a direction controller (known as a reverser) from a center position (that is, from a "neutral" position). A locomotive may also be configured to automatically restart a certain amount of time following an automatic shutdown, such as two or four hours, or when other conditions exist.

The automatic engine start and stop (AESS) system described above has been implemented not only in locomotives which operate independently, but also in multiple locomotives that operate together (i.e., in consist) for providing cumulative (or reserve) towing capacity. The front locomotive in the consist is usually designated the lead unit while the other locomotives are designated trail units. Each trail unit typically receives a trainline signal representing the position of the lead unit's reverser, and treats that signal as representing the position of its own reverser (which is typically placed in the center position when configuring the locomotive for trail unit operation). In the case where a locomotive's reverser must be in the center position to activate the AESS system, placing the lead unit's reverser in the center position will activate the AESS system in each locomotive in the consist. Similarly, in the case where moving an automatically shutdown locomotive's reverser from the center position induces an automatic engine restart, moving the reverser in an automatically shutdown lead unit from the center position induces an automatic restart for each automatically shutdown locomotive in the consist.

Although deployed AESS systems have proven reliable, the inventors hereof have discovered human factors that result in unrealized fuel savings. For example, they discovered that operators frequently take steps to prevent automatic engine shutdowns. This is apparently done so that lead units (including single units operating independently and not in a consist) remain available upon demand (i.e., for operator peace of mind), and to provide climate control (e.g., heating and air conditioning) to the operator cabin. Common approaches to preventing automatic engine shutdowns include maintaining a lead unit's reverser out of the center position, and manually moving an automatic start/stop disable switch (ASDS), typically located in a CA1 locker, to an "off" position. Service personnel may also forget to move the ASDS to its "on" position after switching it "off" for safety during maintenance procedures. Regardless of how or why it occurs, preventing an AESS system in a single locomotive from performing its intended function obviously results in lost fuel savings. Moreover, preventing an auto shutdown in the lead unit of a consist may prevent an auto shutdown for each trail unit in the consist. Thus, although an operator may, for example, maintain the lead unit's reverser out of the center position for the sole purpose of keeping the lead unit running, the net result may be that two, three, or even more trail units remain running and consuming fuel, in addition to the lead unit.

A related problem discovered by the inventors is unnecessary operator induced restarts, which occur, for example, when an operator moves the reverser of an automatically shutdown locomotive away from the center position. The apparent reasons for such restarts are essentially the same as those for preventing automatic engine shutdowns, namely, to resume on-demand availability of lead units and to provide climate control to the operator cabin. Again, while an operator's intention may be to simply restart a lead unit, the effect may be to restart every locomotive in a consist.

There are also conditions generally unrelated to locomotive operators which may prevent a locomotive equipped with an AESS system from initiating an automatic shutdown. For example, many railroad companies require their locomotives to operate in parked idle for some minimum amount of time, such as ten or thirty minutes, prior to an automatic shutdown. Similarly, locomotives may be required to run or idle for some minimum amount of time following an automatic restart, such as for two hours, before the locomotive is permitted to again shutdown automatically. Additionally, many AESS systems will not initiate an automatic shutdown if, for example, ambient and engine oil temperatures are not within predefined ranges, or if a locomotive fault is detected, or if the locomotive's distributed power unit is on, etc. Thus, any one of a number of conditions may prevent an automatic engine shutdown, some of which are operator dependent and some of which are not.

Currently deployed AESS systems monitor a limited number of parameters related to automatic engine shutdowns and restarts. For example, they typically monitor how long a locomotive is automatically shutdown, how long a locomotive's AESS system is disabled (due to the ASDS position), as well as the amount of time that certain other parameters (e.g., engine oil temperature, ambient temperature, battery charging current, etc.) are out-of-range. As recognized by the inventors hereof, however, operators may prevent automatic shutdowns without disabling their AESS systems. Thus, how long an AESS system is disabled does not necessarily equate to how long an automatic shutdown is prevented by an operator. The inventors have also recognized that several monitored parameters may be out-of-range at the same time. Thus, how long each monitored parameter is out-of-range does not necessarily reveal how long such parameters as a group prevent an automatic shutdown.

For these and other reasons, the inventors have recognized a need to monitor locomotive operating conditions and events in closer detail so that, among other things, various causes of lost fuel savings may be more specifically identified and addressed.

SUMMARY OF THE INVENTION

In order to solve these and other needs in the art, the inventors hereof have designed a locomotive monitoring system that preferably defines several mutually exclusive operating states. At any given time, the locomotive is deemed to be operating in one and only one of these operating states. The total amount of time that the locomotive operates in each state is preferably determined and recorded. This recorded information can then be evaluated with a view towards improving locomotive operations. For example, a plurality of mutually exclusive idle states can be defined and monitored to determine how long a locomotive idles under certain conditions instead of automatically shutting down for the purpose of conserving fuel. In this manner, the sources of lost fuel savings can be readily identified, quantified and addressed. An event log is also provided for chronicling certain operating events of interest over time, such as those relating to the starting, stopping and/or idling of the locomotive's engine.

According to one aspect of the present invention, a locomotive monitoring system includes a memory device for storing computer instructions and a computer processor for executing the computer instructions stored in the memory device. The computer instructions define a plurality of mutually exclusive idle states. The locomotive operates in one of the mutually exclusive idle states when idling. The computer instructions configure the computer processor to determine how long the locomotive operates in each of a plurality of the mutually exclusive idle states, and to record data indicative thereof in the memory device.

According to another aspect of the present invention, a method of monitoring operation of a locomotive having an automatic engine start/stop (AESS) system includes: defining a plurality of mutually exclusive idle states, the locomotive operating in one of the mutually exclusive idle states when the locomotive's engine is idling; monitoring how long the locomotive operates in each of a plurality of the mutually exclusive idle states; and recording results of the monitoring.

According to yet another aspect of the invention, a method of monitoring operation of a locomotive having an automatic engine start/stop (AESS) system includes: defining a plurality of events related to automatic starting or stopping of the locomotive's engine; monitoring operation of the locomotive; and recording event data when one or more of the defined events occur.

According to a further aspect of the invention, a method of monitoring a locomotive configured to automatically shutdown its engine when predefined shutdown parameters are satisfied includes: defining a parameter set to include at least two of the predefined shutdown parameters; measuring a duration of time commencing when any one or more parameters of the defined parameter set are not satisfied and ending when each parameter of the defined parameter set is satisfied; and recording the measured duration of time.

According to still another aspect of the invention, a computer-readable medium has computer-executable instructions recorded thereon for implementing any one or more of the systems and methods described herein.

Other aspects and features of the present invention will be in part apparent and in part pointed out hereinafter.

BRIEF DESCRIPTION OF THE DRAWINGS

FIG. 4 is an exemplary event report produced by the system of FIG. 1.

Corresponding reference characters indicate corresponding features throughout the several views of the drawings.

DETAILED DESCRIPTION OF PREFERRED EMBODIMENTS

Figure 1:
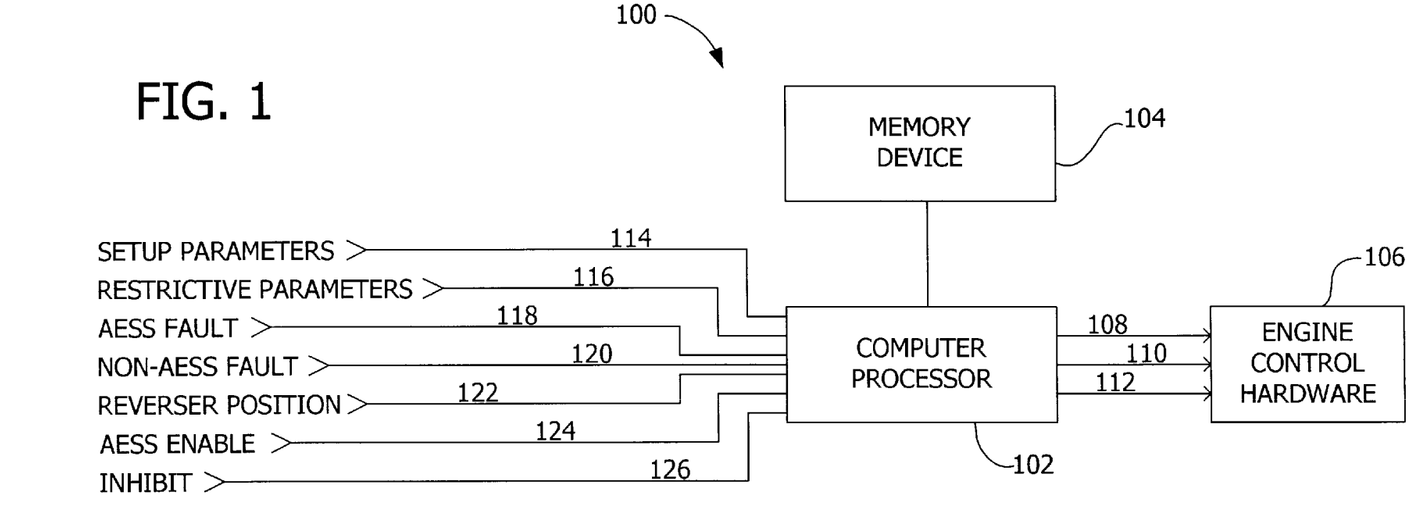
FIG. 1 is a functional block diagram of a locomotive monitoring and control system according to one preferred embodiment of the present invention.

A locomotive monitoring and control system according to one preferred embodiment of the present invention is illustrated in FIG. 1 and indicated generally by reference character 100. As shown in FIG. 1, the system 100 includes a computer processor 102, a memory device 104 and engine control hardware 106. The memory device 104 may itself comprise multiple static and/or dynamic memory devices, as is common. The memory device 104 preferably stores computer instructions for execution by the computer processor 102. These computer instructions configure the computer processor 102 to monitor various locomotive operating conditions, and to output one or more commands when predefined conditions exist. The engine control hardware controls the locomotive engine (not shown) in response to commands output by the computer processor 102 including, for example, a motor command 108, a shutdown command 110, and a startup command 112. As apparent to those skilled in the art, the engine control hardware 106 may include a variety of components including an alternator, a fuel pump, invertors, relays, etc.

In the particular embodiment under discussion, the system 100 includes automatic engine start/stop (AESS) functionality. In other words, the system 100 is configured to automatically stop the locomotive engine (i.e., by outputting the shutdown command 110) when a set of automatic shutdown parameters are satisfied, and to automatically restart the locomotive engine (i.e., by outputting the startup command 112) when one or more automatic restart parameters are satisfied. As further explained below, the system 100 is also configured to record how long the locomotive operates in each of several mutually exclusive operating states, and to log certain operating events of interest.

As shown illustratively in FIG. 1, the computer processor 102 is provided with several inputs 114–126 for monitoring exemplary automatic shutdown and restart parameters. Via input 114, the computer processor monitors a group of parameters, referred to herein as "setup parameters," which are used in this embodiment to determine whether the locomotive is operating in parked idle (and might therefore qualify for an automatic shutdown). Via input 116, the processor monitors another group of parameters, referred to herein as "restricting parameters," described further below. Via inputs 118 and 120, the computer processor 102 monitors whether there are any locomotive faults related or unrelated to the AESS system. Via inputs 122 and 124, the processor monitors the locomotive's reverser position (or a lead unit's reverser position, if the locomotive is operating as a trail unit in a consist) and determines whether the AESS system is enabled, respectively.

The system 100 is preferably configured to suspend operation of the AESS system in response to operator input, such as upon receiving an inhibit command from an operator. In this manner, an operator may prevent or postpone an automatic engine shutdown without manually disabling the AESS system. An exemplary system having this functionality is described in commonly owned U.S. application Ser. No. 09/873,841 entitled AUTOMATIC START/STOP SYSTEM AND METHOD FOR LOCOMOTIVE ENGINES and filed Jun. 4, 2001, the entire disclosure of which is incorporated herein by reference. Referring again to FIG. 1, the computer processor 102 is provided with an input 126 for receiving such inhibit commands from operators.

Those skilled in the art will recognize that the monitoring and control system 100 may include components in addition to those shown in FIG. 1, and that the computer processor 102 may include inputs and outputs in addition to (or instead of) those shown in FIG. 1. Further, each exemplary input shown in FIG. 1 may be combined with other inputs, or may itself comprise multiple distinct inputs to the computer processor 102. For example, in lieu of the single input 114 shown in FIG. 1, the computer processor 102 may be provided with a separate input for each monitored setup parameter.

Figure 2:
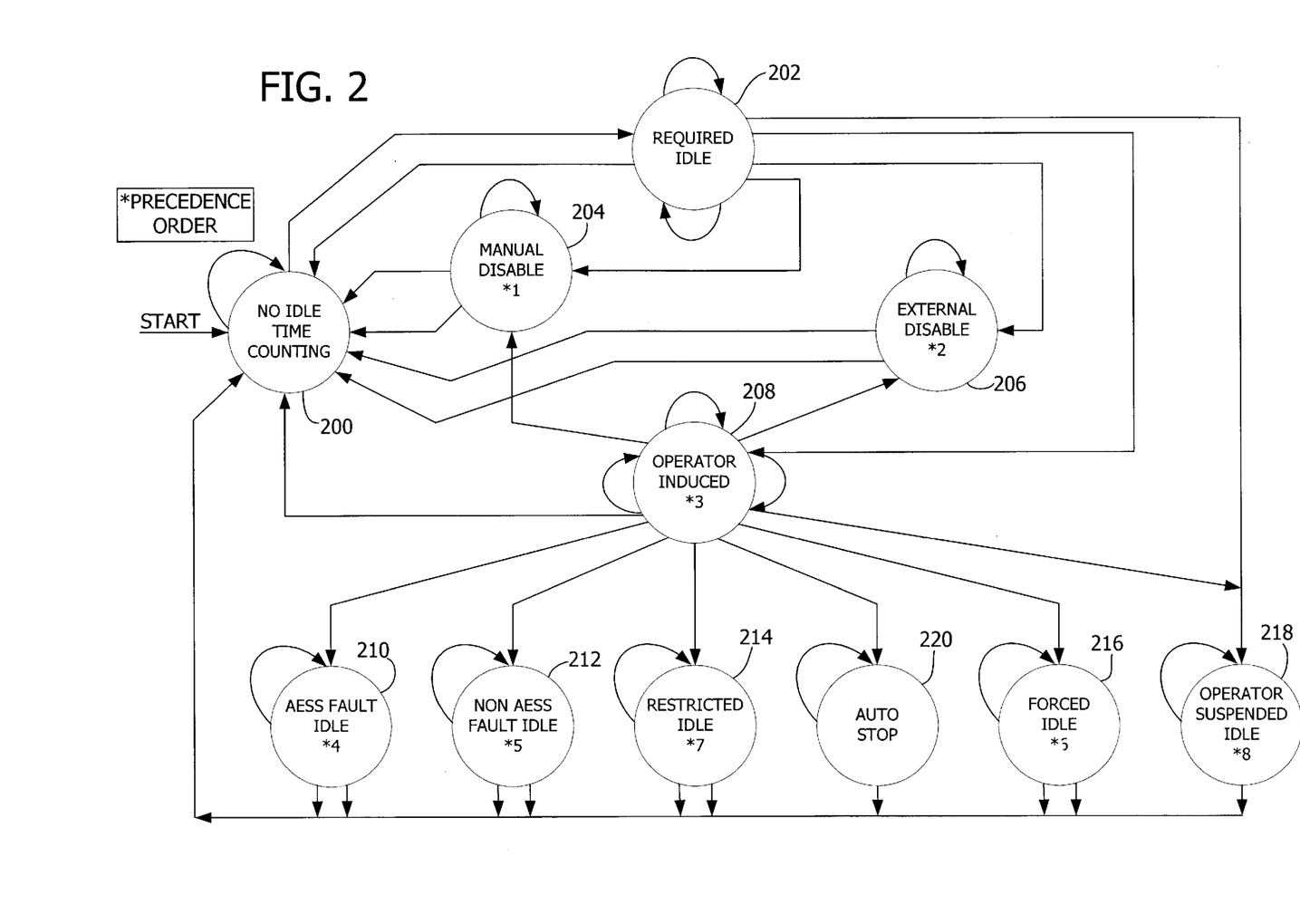
FIG. 2 is a state diagram illustrating a preferred operation for the system of FIG. 1.

One manner in which the system 100 monitors a locomotive's operation will now be described with reference to the state diagram of FIG. 2. The general logic of this state diagram is as follows: if one or more setup parameters (which are monitored by the computer processor 102 via input 114) are out-of-range (e.g., because the locomotive is motoring), the locomotive is deemed not operating in parked idle, and there is considered no viable opportunity to automatically shutdown the locomotive for the purpose of conserving fuel. During this time, the system 100 operates in a no idle time counting state 200, as shown in FIG. 2. In this particular embodiment, the system 100 neither monitors nor records how long it operates in the no idle time counting state 200.

When all setup parameters are satisfied (including, for example, a locomotive speed of zero and the throttle in idle position), the locomotive is deemed operating in parked idle. An opportunity should therefore exist for the AESS system to automatically shutdown the locomotive unless one or more automatic shutdown parameters (other than the setup parameters) are out-of-range. Thus, when all setup parameters are satisfied, the system 100 operates in one of several mutually exclusive idle states 202–218, depending upon which shutdown parameter is out-of-range, or in an auto stop state 220 if the locomotive has been automatically shutdown. The computer processor 102 monitors and records in memory 104 the amount of time spent by the system in each of these states 202–220. In this manner, the specific conditions that prevent automatic shutdowns, and the amount of time that such conditions persist, are advantageously determined.

If one or more setup parameters fall out-of-range while the system is operating in one of the mutually exclusive states 202–220, the locomotive will no longer be considered operating in parked idle. Therefore, the system will transition back to the no idle time counting state 200. In the particular embodiment under discussion, the setup parameters include: zero locomotive speed; independent brakes applied; engine running; throttle in idle position; air compressor test not running; etc. As will be apparent, however, the setup parameters may be defined as desired for any particular application of the present invention.

The cumulative amount of time spent by the system 100 in each of the mutually exclusive idle states 202–218 corresponds to the total amount of time that the locomotive operates in parked idle. Thus, the mutually exclusive states are preferably defined to provide a desired level of granularity for parked idle time. In the particular embodiment under discussion, these states are defined to include: a required idle state 202; a manual disable idle state 204; an external disable idle state 206; an operator induced idle state 208; an AESS fault idle state 210; a non-AESS fault idle state 212; a restricted idle state 214; a forced idle state 216; and an operator suspended idle state 218.

The manner and order in which the system preferably transitions through the mutually exclusive states 200–220 will now be described. The locomotive is preferably required to idle some minimum amount of time with all automatic shutdown parameters satisfied prior to initiating an automatic shutdown. In this embodiment, the required idle time is thirty minutes prior to the first automatic engine shutdown, and ten minutes prior to each subsequent automatic shutdown (i.e., until the locomotive is manually shutdown). Referring again to FIG. 2, each time the setup parameters become satisfied, the system transitions from the no idle time counting state 200 to the required idle state 202. The system then remains in the required idle state 202 for ten or thirty minutes, depending on whether the first or a subsequent automatic shutdown is pending, or for less time if one of the setup parameters falls out-of-range.

Assuming all setup parameters remain satisfied, when the required idle time has passed, the system transitions from the required idle state 202 to one of the other states 204–220, depending upon which shutdown parameters (other than the setup parameters), if any, are out-of-range, and further depending on an order of precedence defined for such states. If the AESS system is disabled (e.g., because the ASDS is in the "off" position), the system will transition to the manual disable state 204. The system will remain in this state 204 accruing time until the AESS system is enabled (e.g., by moving the ASDS to the "on" position), at which time the system will transition back to the no idle time counting state 200. If, instead, an external disable signal is asserted (e.g., because a distributed power unit is on) when the required idle time has passed, the system will transition from the required idle state 202 to the external disable state 206. The system will then remain in this state 206 accruing time until the external disable signal becomes unasserted, at which time the system will transition back to the no idle time counting state 200.

In this particular embodiment, and as indicated in FIG. 2, the manual disable state 204 is defined as having precedence over the external disable state 206. Thus, if the AESS system is disabled at the same time that the external disable signal is asserted, the system will transition to the manual disable state 204. As a result, parked idle time is "charged" in this instance to the manual disable state 204 rather than the external disable state 206.

If the AESS system is enabled and the external disable signal is unasserted when the required idle time has passed, system operation will transition from the required idle state 202 to the operator induced idle state 208, which is a pass-through state. In other words, if each of several operator dependent parameters, referred to herein as "stop triggers," are satisfied, system operation will pass through the operator induced idle state 208 without accruing time. If all automatic shutdown parameters are satisfied, and have been satisfied since the outset of the required idle time, the locomotive will be automatically shutdown, and system operation will transition to the auto stop state 220 for accruing time. Alternatively, the system will remain in the operator induced idle state 208 accruing time for so long as one or more stop triggers are out-of-range. In this particular embodiment, the stop triggers include the reverser in center position, an engine control switch in the "jog" position, etc.

Note that the manual disable and external disable idle states 204, 206 are defined as having precedence over the operator induced idle state 208. Thus, if the AESS system becomes disabled or the external disable signal is asserted while the system is operating in the operator induced idle state 208, the system will transition to either the manual disable idle state 204 or the external disable idle state 206 for accruing time, as appropriate. Otherwise, if all stop triggers are satisfied, system operation will transition from the operator induced idle state 208 to one of the following states, which are listed in their order of precedence: the AESS fault state 210, if a locomotive fault related to the AESS system is detected; the non-AESS fault state 212, if a locomotive fault unrelated to the AESS system (e.g., an inverter or cranker fault) is detected; the restricted idle state 214, if one or more restricting parameters are out-of-range; the forced idle state 216, if the locomotive is required to continue idling until a minimum amount of time (e.g., two hours) has passed since a most recent automatic restart (this requirement limits the number of times that the locomotive is automatically stopped and started in a given period of time); or the operator suspended state 218, if the operator has provided an inhibit command for preventing or postponing an automatic engine shutdown. In the particular embodiment under discussion, the restricting parameters include an ambient temperature, a battery charging current, and an engine oil temperature within predefined ranges, no calls for brake air (also known as "air calls"), and no cranking restriction exclusions (i.e., no cranker-related faults).

As noted above, each time the setup parameters become satisfied, system operation transitions from the no idle time counting state 200 to the required idle state 202. If all other automatic shutdown parameters are not satisfied at that time, then when such parameters do become satisfied, system operation will transition from the then current state, through the no idle time counting state 200, and back to the required idle state 202, as illustrated diagrammatically in FIG. 2. In this manner, the required idle time is reset each time all automatic shutdown parameters become satisfied.

The "looping back" arrows in FIG. 2 (i.e., arrows which begin and end at the same state) indicate that as long as prerequisite conditions for a particular state exist, the system remains in that state.

Although the state diagram of FIG. 2 is preferred for the particular embodiment under discussion, it should be recognized that the total number of mutually exclusive states and the manner in which each such state is defined, including their orders of precedence, may vary in other implementations of the invention.

Preferably, the computer processor 102 monitors and records, for each of the states 202–220, how long the system has operated in such state both historically and since a most recent download of such recorded information. The recorded information is preferably downloaded, in a single step and as a hexadecimal file, using a "toolbox" in a manner known in the art. Appropriate reader software can then be used to produce reports from the downloaded data, preferably in a Windows format, to illustrate and analyze the efficiency of the AESS system in a particular locomotive.

Figure 3:
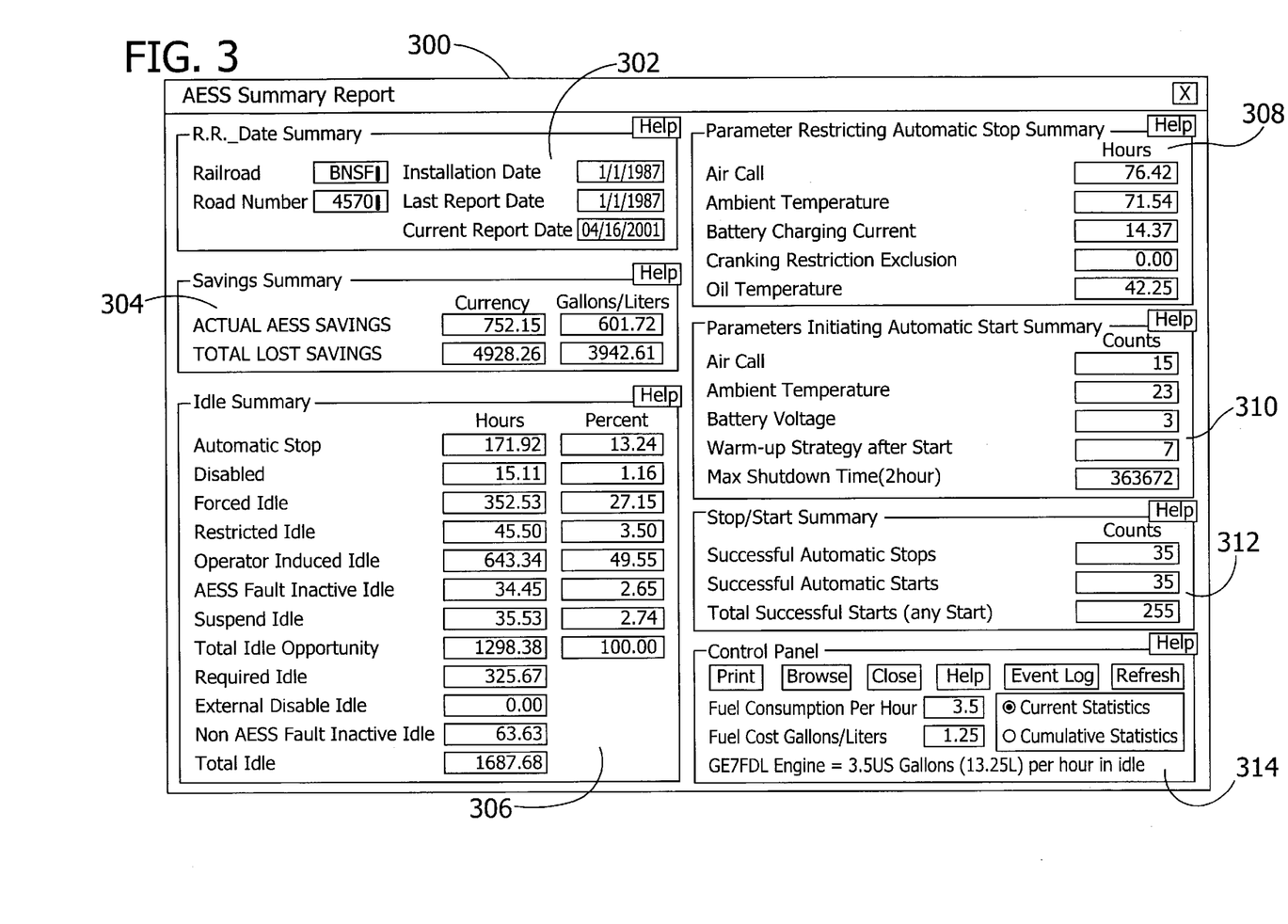
FIG. 3 is a statistical report summarizing the amount of time spent by the system of FIG. 1 in each of the several states shown in FIG. 2.

A sample report 300 produced from data collected by the system 100 is shown in FIG. 3. The report 300 includes a railroad/date summary 302, a savings summary 304, an idle summary 306, a parameter restricting automatic stop summary 308, a parameters inhibiting automatic start summary 310, a stop/start summary 312, and a control panel 314. Preferably included in the railroad/date summary 302, as shown in FIG. 3, is the name of the applicable railroad, the road number, the installation date of the AESS system, the date of a most recent prior report, and the date of the current report 300. The savings summary 304 preferably quantifies actual fuel savings (i.e., "ACTUAL AESS SAVINGS") and lost fuel savings (i.e., "TOTAL LOST SAVINGS") in terms of both volume (i.e., gallons or liters) and corresponding cost (e.g., in dollars). These figures are based upon fuel consumption and cost figures specified in the control panel 314.

The idle summary 306 preferably identifies how long the system 100 operated in each of the mutually exclusive states 202–220 shown in FIG. 2. For example, an automatic stop entry lists the amount of time that the system operated in the auto stop state 220. Similarly, the disabled, forced idle, restricted idle, operator induced idle, AESS fault inactive idle, and suspend idle entries list the amounts of time that the system operated in the manual disable state 204, the forced idle state 216, the restricted idle state 214, the operator induced idle state 208, the AESS fault idle state 210, and the operator suspended idle state 218, respectively. These entries are summed to produce the "total idle opportunity" entry shown in FIG. 2 (for purposes of the report 300, the "total idle opportunity" includes the amount of time spent in automatic shutdown). All of the aforementioned entries are preferably indicated in terms of time (e.g., hours) as well as a percentage of the total idle opportunity. Also included in the idle summary 306 are required idle, external disable idle, and non-AESS fault inactive idle entries which correspond to the amount of time that the system 100 operated in the required idle state 202, the external disable idle state 206, and the non-AESS fault idle state 212, respectively. These latter three entries are summed together with the total idle opportunity to produce a total idle figure, which represents the total amount of time that the system operated in one of states 202–220 (i.e., the total amount of parked idle time).

As noted above, the restricted idle entry in the idle summary 306 is provided to identify how long any one or more of the restricting parameters were out-of-range. Separately identified in the parameter restricting automatic stop summary 308 is how long each individual restricting parameter was out-of-range.

The parameters initiating automatic start summary 310 identifies the number of times (i.e., counts) that each of several events caused an automatic engine restart. For example, in the sample report 300, the number of air calls that resulted in an automatic restart is listed as fifteen. Other restart-initiating events included in the summary 310 are out-of-range ambient temperatures, out-of-range battery voltages, and maximum shutdown time exceeded. The summary 310 also indicates the number of times the locomotive initiated a warm-up strategy upon restart. The stop/start summary 312 lists (in "counts") the number of successful automatic stops, successful automatic starts, and total successful starts (i.e., not necessarily automatic starts), as can be seen in FIG. 3.

The control panel 314 enables a user to, among other things, enter fuel consumption and cost figures, and to select whether current statistics (i.e., collected since the most recent prior download) or cumulative statistics (i.e., collected since the installation date of the applicable AESS system) should be displayed in the report 300.

It should be understood that the data included in the sample report 300 is exemplary, and may differ from actual data collected in any given implementation of the invention.

In addition to allocating parked idle time between the mutually exclusive states 202–220 shown in FIG. 2, the system 100 preferably also chronicles the occurrence of certain events useful in evaluating the effectiveness of the AESS system and the locomotive operator's performance. In the particular embodiment under discussion, the system 100 is configured (via software instructions stored in the memory device 104) to log the date, time and type of the following events: any engine start; any engine stop; the first transition to a powered mode following a forced engine start; the first normal engine stop restriction following a forced engine start; and any mode change for the AESS system. In this embodiment, a "forced engine start" occurs when an operator moves the reverser handle out of the center position, or releases the brakes, or manually cranks the engine. The powered modes include motoring, brake setup, brake, self load, and self unload. The normal engine stop restrictions following a forced engine start include when ambient temperature is out-of-range, and when the locomotive speed is greater than zero.

The potential modes for the AESS system include: OFF, during which the engine is not automatically stopped or started, but selected inputs (including the AESS enable input 124) are still processed; INACTIVE, during which the locomotive is not automatically stopped or started, but all inputs are processed (such as when the engine is manually stopped or a locomotive fault is detected); SUSPEND, during which the engine shall not be automatically stopped, but all inputs are processed; and ACTIVE, during which all inputs are processed and the engine is automatically stopped and started when appropriate.

FIG. 4 illustrates an exemplary event report produced from event data logged by the system 100. As shown in FIG. 4, each logged event is preferably assigned an event number (consecutively), and preferably includes the day, date and time when each logged event occurred, as well as the type and a brief description of each logged event. As apparent to those skilled in the art, the report of FIG. 4 represents another useful tool for analyzing locomotive operating conditions including, for the particular embodiment under discussion, the specific causes of lost fuel savings.

While the monitoring and control system 100 has been described above as allocating parked idle time between several mutually exclusive states and logging certain events of interest, it could be configured to perform only one of these functions without departing from the scope of the present invention. Similarly, although the system 100 has been described as implementing both monitoring and control functions, those skilled in the art will recognize that such functions may instead be implemented using multiple distinct systems.

It should also be understood that while the preferred embodiment described above is primarily focused on monitoring AESS system-related operations for the purpose of conserving fuel, the teachings of the invention are not so limited, and may be applied to monitoring the operation of locomotives not provided with AESS systems.

When introducing elements or features of the present invention or the preferred embodiment(s) thereof, the articles "a", "an", "the" and "said" are intended to mean that there are one or more such elements or features. The terms "comprising", "including" and "having" are intended to be inclusive and mean that there may be additional elements or features other than those listed.

As various changes could be made in the above embodiments without departing from the scope of the invention, it is intended that all matter contained in the above description or shown in the accompanying drawings shall be interpreted as illustrative and not in a limiting sense.

What is claimed:

1. A monitoring system for a locomotive, the monitoring system comprising:

a memory device for storing computer instructions; and a computer processor for executing the computer instructions stored in the memory device;

wherein the computer processor monitors operation of the locomotive;

wherein the computer instructions define a plurality of mutually exclusive idle states;

wherein the computer processor determines in which of the mutually exclusive idle states the locomotive is deemed operating when idling; and wherein the computer instructions configure the computer processor to determine how long the locomotive operates in one or more of the plurality of the mutually exclusive idle states, and to record data indicative thereof in the memory device.

2. The system of claim 1 wherein the computer instructions define an order of precedence for the mutually exclusive idle states, and the locomotive is deemed to operate in a particular one of the mutually exclusive idle states according to the defined order of precedence.

3. The system of claim 1 wherein the locomotive comprises an AESS system, the computer instructions further define an auto stop state, and the computer processor determines how long the locomotive operates in the auto stop state and records data indicative thereof in the memory device.

4. The system of claim 1 wherein the computer instructions configure the computer processor to output one or more commands when one or more predefined conditions exist, the system further comprising engine control hardware for controlling the locomotive's engine in response to commands output by the computer processor.

5. The system of claim 1 wherein the locomotive comprises an AESS system and the computer instructions configure the computer processor to record in the memory device event information relating to automatic starting and stopping of the locomotive's engine.

6. A method of monitoring operation of a locomotive having an automatic engine start/stop (AESS) system, the method comprising:

defining a plurality of mutually exclusive idle states, the locomotive operating in one of said mutually exclusive idle states when the locomotive's engine is idling;

monitoring how long the locomotive operates in each of a plurality of the mutually exclusive idle states; and recording results of the monitoring.

7. The method of claim 6 wherein defining includes defining an automatic stop state, the locomotive operating in the automatic stop state when the locomotive's engine is automatically shutdown, and monitoring includes monitoring how long the locomotive operates in the automatic stop state.

8. The method of claim 6 wherein the plurality of mutually exclusive idle states include at least one state in which the locomotive will not automatically shutdown due to operator input.

9. The method of claim 6 further comprising producing an idle summary from the recorded results.

10. The method of claim 9 wherein the idle summary identifies how long the locomotive operated in each of a plurality of the mutually exclusive idle states.

11. The method of claim 9 wherein the idle summary quantifies lost fuel savings as a function of how long the locomotive operated in one or more of the mutually exclusive idle states.

12. The method of claim 6 wherein the mutually exclusive idle states include a required idle state in which the locomotive must operate for a predefined time period prior to an automatic engine shutdown.

13. The method of claim 6 wherein the mutually exclusive idle states include an AESS fault state during which a locomotive fault related to the AESS system prevents an automatic shutdown.

14. The method of claim 6 wherein the mutually exclusive idle states include a restricted idle state during which one or more automatic shutdown parameters independent of operator input are out-of-range.

15. The method of claim 6 wherein the mutually exclusive idle states include an operator induced idle state during which one or more automatic shutdown parameters dependent on operator input are not satisfied.

16. The method of claim 6 wherein the mutually exclusive idle states include an AESS disabled state during which the AESS system is manually disabled by an operator.

17. The method of claim 6 wherein the mutually exclusive idle states include a forced idle state in which the locomotive may operate until a predefined time period since a most recent automatic shutdown expires.

18. The method of claim 6 wherein the mutually exclusive idle states include a non-AESS fault state during which a locomotive fault unrelated to the AESS system prevents an automatic shutdown.

19. The method of claim 6 wherein the mutually exclusive idle states include a suspended idle state during which an automatic shutdown is at least temporarily postponed in response to operator input.

20. The method of claim 6 wherein the mutually exclusive idle states include an external disable state during which the AESS system is disabled in response to a command from another locomotive device.

21. The method of claim 6 wherein the mutually exclusive idle states include a state during which one or more setup parameters are out-of-range, the one or more setup parameters determining whether the locomotive is operating in parked idle.

22. A method of monitoring operation of a locomotive having an engine with an automatic engine start/stop (AESS) system, the method comprising:

defining a plurality of events related to automatic starting or stopping of the locomotive engine;

monitoring data indicative of an operation of the locomotive including monitoring when automatic starting or stopping events of the locomotive engine occur;

recording in memory the monitored data indicating when one or more defined automatic starting or stopping events occurred;

identifying, from the recorded data, which of the one or more defined automatic starting or stopping events has occurred; and generating a report as a function of the identified events for analyzing operation of the locomotive.

23. The method of claim 22 wherein recording data includes recording data chronologically according to an order in which the one or more defined events occurred.

24. The method of claim 22 wherein the recorded data includes a description of the one or more defined events that occurred.

25. The method of claim 22 wherein the defined plurality of events includes a transition to a powered mode following an operator-induced engine restart.

26. The method of claim 25 wherein the powered mode is selected from a group consisting of motoring, brake setup, brake, self load, and self unload.

27. The method of claim 22 wherein the defined plurality of events includes an engine stop restriction following an operator-induced engine restart.

28. The method of claim 22 wherein the defined plurality of events includes an AESS system mode change.

29. A method of monitoring a locomotive configured to automatically shutdown its engine when predefined shutdown parameters are satisfied, the method comprising:

defining a parameter set to include at least two of the predefined shutdown parameters;

measuring a duration of time commencing when any one or more parameters of the defined parameter set are not satisfied and ending when each parameter of the defined parameter set is satisfied; and recording the measured duration of time.

30. The method of claim 29 wherein the predefined shutdown parameters include parameters independent of operator input, and the parameter set is defined to include at least two of the operator independent parameters.

31. The method of claim 29 wherein the predefined shutdown parameters include parameters dependent on operator input, and the parameter set is defined to include at least two of the operator dependent parameters.

32. The method of claim 29 further comprising measuring, for each predefined shutdown parameter included in the parameter set, a duration of time commencing when such shutdown parameter is not satisfied and ending when such shutdown parameter is satisfied, and recording the measured durations of time.

* * * * *